United States Patent
Eda et al.

(10) Patent No.: US 11,145,011 B2
(45) Date of Patent: Oct. 12, 2021

(54) SYSTEM, METHOD, AND COMPUTER-READABLE RECORDING MEDIUM OF POWER SALE TIMING OPTIMUM CONTROL

(71) Applicant: OMRON Corporation, Kyoto (JP)

(72) Inventors: Takayuki Eda, Tatebayashi (JP); Kazuki Kasai, Tokyo (JP); Hiroshi Imai, Nara (JP); Hiromasa Takatsuka, Tokyo (JP); Fumiji Aita, Nara (JP)

(73) Assignee: OMRON Corporation, Kyoto (JP)

( * ) Notice: Subject to any disclaimer, the term of this patent is extended or adjusted under 35 U.S.C. 154(b) by 534 days.

(21) Appl. No.: 15/751,459

(22) PCT Filed: Nov. 17, 2016

(86) PCT No.: PCT/JP2016/084142
§ 371 (c)(1),
(2) Date: Feb. 8, 2018

(87) PCT Pub. No.: WO2017/145463
PCT Pub. Date: Aug. 31, 2017

(65) Prior Publication Data
US 2018/0232818 A1      Aug. 16, 2018

(30) Foreign Application Priority Data

Feb. 25, 2016   (JP) .............................. JP2016-034081

(51) Int. Cl.
*G06Q 50/06*      (2012.01)
*H02J 3/32*       (2006.01)
(Continued)

(52) U.S. Cl.
CPC ............. *G06Q 50/06* (2013.01); *G06N 5/022* (2013.01); *G06Q 10/04* (2013.01); *H02J 3/32* (2013.01);
(Continued)

(58) Field of Classification Search
CPC ..................................................... G06Q 50/06
(Continued)

(56) References Cited

U.S. PATENT DOCUMENTS

2004/0230377 A1    11/2004   Ghosh et al.
2005/0246220 A1 *  11/2005   Thomson ........... G06Q 30/0605
                                                    705/7.35

(Continued)

FOREIGN PATENT DOCUMENTS

CN           102474117          5/2012
CN           102792543          11/2012
(Continued)

OTHER PUBLICATIONS

Worthmann et al., "Distributed and Decentralized Control of Residential Energy Systems Incorporating Battery Storage", IEEE Transactions on Smart Grid, 4, 1914, 1923 (Year: 2015).*

(Continued)

*Primary Examiner* — Emmett K. Walsh
(74) *Attorney, Agent, or Firm* — JCIPRNET

(57) ABSTRACT

This power sale timing optimum control system is provided with a communication unit, a demand prediction unit, a supply prediction unit, and a timing determination unit. The communication unit acquires the amount of power stored in each of multiple power storage devices. The demand prediction unit predicts a total amount of demand on power in a utility customer group. On the basis of the acquired amount of stored power, the supply prediction unit predicts the total amount of suppliable power that can be supplied in the utility customer group. The timing determination unit determines a power sale timing on the basis of the predicted total amount of demand and the predicted total amount of suppliable power.

6 Claims, 8 Drawing Sheets

(51) Int. Cl.
 *G06Q 10/04* (2012.01)
 *G06N 5/02* (2006.01)
 *H02J 3/38* (2006.01)
 *H02J 3/00* (2006.01)

(52) U.S. Cl.
 CPC .............. *H02J 3/381* (2013.01); *H02J 3/003* (2020.01); *H02J 2310/64* (2020.01)

(58) Field of Classification Search
 USPC ........................................................ 705/412
 See application file for complete search history.

(56) References Cited

U.S. PATENT DOCUMENTS

| | | | | |
|---|---|---|---|---|
| 2007/0198365 | A1* | 8/2007 | Dutta | G06Q 30/06 705/26.1 |
| 2008/0147566 | A1* | 6/2008 | Malik | G06Q 30/08 705/36 R |
| 2011/0246259 | A1* | 10/2011 | Hostyn | B60L 58/12 705/7.31 |
| 2013/0006831 | A1* | 1/2013 | Mise | G06Q 30/02 705/37 |

FOREIGN PATENT DOCUMENTS

| | | |
|---|---|---|
| CN | 103208853 | 7/2013 |
| CN | 103259335 | 8/2013 |
| CN | 103890805 | 6/2014 |
| CN | 104376379 | 2/2015 |
| EP | 1906353 | 4/2008 |
| EP | 2892123 | 7/2015 |
| JP | 2003281231 | 10/2003 |
| JP | 2012060800 | 3/2012 |
| JP | 2012175795 | 9/2012 |
| JP | 2013097495 | 5/2013 |
| JP | 2014032630 | 2/2014 |
| JP | 5509004 | 6/2014 |

OTHER PUBLICATIONS

"International Search Report (Form PCT/ISA/210) of PCT/JP2016/084142", dated Feb. 7, 2017, with English translation thereof, pp. 1-4.

"Written Opinion of the International Searching Authority of PCT/JP2016/084142" with English translation thereof, dated Feb. 7, 2017, p. 1-p. 6.

"Search Report of Europe Counterpart Application", dated Jun. 17, 2019, p. 1-p. 7.

Office Action of China Counterpart Application, with English translation thereof, dated Mar. 12, 2021, pp. 1-20.

* cited by examiner

SYSTEM, METHOD, AND COMPUTER-READABLE RECORDING MEDIUM OF POWER SALE TIMING OPTIMUM CONTROL

CROSS-REFERENCE TO RELATED APPLICATION

This application is a 371 application of the international PCT application serial no. PCT/JP2016/084142, filed on Nov. 17, 2016, which claims the priority benefit of Japanese application serial no. 2016-034081, filed on Feb. 25, 2016. The entirety of each of the above-mentioned patent applications is hereby incorporated by reference herein and made a part of this specification.

TECHNICAL FIELD

The present invention relates to a system, a method, and a computer-readable recording medium of power sale timing optimum control.

BACKGROUND ART

In recent years, power generation devices that generate power using renewable energy (for example, solar power generation devices) have been utilized. In Japan, since a surplus power purchase system has been enacted, it is possible to sell power generated by a solar power generation device, a wind power generation device, or the like to a power company (see, for example, Patent Literature 1).

In an energy management device disclosed in Patent Literature 1, power information on at least one of power consumption of a load device, generated power of a distributed power supply, sale power from a commercial power supply, and sale power to the commercial power supply is acquired. Billing information is calculated on the basis of the acquired power information and transmitted to a communication terminal in response to a request from the communication terminal.

CITATION LIST

Patent Literature

[Patent Literature 1]
Japanese Unexamined Patent Application Publication No. 2014-32630

SUMMARY OF INVENTION

Technical Problem

However, in the above-described device of the related art, an advantageous power sale timing of generated power cannot be determined.

That is, for example, when power sale is performed in market trading, a price for the power sale is determined according to the amount of stored power of other users, but since the amount of stored power of other users is not known, an advantageous sale timing cannot be determined.

An object of the present invention is to provide a power sale timing optimum control system, a power sale timing optimum control method, and a power sale timing optimum control program capable of determining an advantageous power sale timing in consideration of the above problems of the related art.

Solution to Problem

A power sale timing optimum control system according to a first invention is a power sale timing determination device that determines a power sale timing of a predetermined customer that owns both a storage battery and a power generation device in a customer group including a plurality of customers, and includes a stored power amount acquisition unit, a customer group demand amount prediction unit, a customer group power supply amount prediction unit, and a timing determination unit. The stored power amount acquisition unit acquires the amount of stored power of each of a plurality of storage batteries owned by the customer group. The customer group demand amount prediction unit predicts a total amount of demand on power of the customer group. The customer group power supply amount prediction unit predicts a total amount of suppliable power that can be supplied by the customer group on the basis of the acquired amount of stored power. The timing determination unit determines the power sale timing of the predetermined customer on the basis of the predicted total amount of demand and the total amount of suppliable power predicted in the customer group.

Accordingly, it is possible to predict the total amount of demand in the customer group and predict the total amount of suppliable power on the basis of the amounts of stored power of the respective customers. It is possible to determine the power sale timing on the basis of the predicted total amount of demand and the total amount of suppliable power.

For example, in market trading, if power sale to a power company or another customer is performed when the total amount of demand is greater than the total amount of suppliable power, it is conceivable that a price of power will be set high.

Therefore, it is possible to determine an advantageous power sale timing with a high price on the basis of the total amount of demand and the total amount of suppliable power.

The customer group may include a customer that does not own a storage battery or a power generation device.

Further, the prediction of the amount of demand may be performed on the basis of, for example, information such as weather forecast (temperature or humidity) or may be performed on the basis of information such as a change in past power consumption.

Further, the prediction of the amount of supply may be performed from, for example, the amount of generated power based on information such as weather forecast (temperature or humidity) or the like, or may be performed on the basis of data of the past amount of generated power.

A power sale timing optimum control system according to a second invention is the power sale timing optimum control system according to the first invention, wherein the timing determination unit determines a time when a ratio of the total amount of power that can be supplied by the customer group to the total amount of demand is equal to or smaller than a first predetermined value to be the power sale timing.

When the ratio of the total amount of supply to the total amount of demand is less than the first predetermined value, the supply is insufficient, and therefore, it is conceivable that the price of the electricity in market trading will be set high. Therefore, by selling electricity at this timing, electricity can be sold at a higher price.

A power sale timing optimum control system according to a third invention is the power sale timing optimum control system according to the first invention further comprising a customer power supply amount prediction unit that predicts an amount of power that can be supplied by the predetermined customer on the basis of the acquired amount of stored power. The timing determination unit determines the power sale timing of the predetermined customer on the basis of the predicted total amount of demand, the predicted total amount of suppliable power for the customer group, and the amount of suppliable power predicted for the predetermined customer.

Thus, the power sale timing can be determined on the basis of the total amount of power that can be supplied by the customer group and the amount of power that can be supplied by a predetermined customer that wishes to sell the power.

For example, when the amount of power that can be supplied by the predetermined customer that wishes to sell the power is large relative to the total amount of power that can be supplied by the customer group, it is conceivable that the price can be set favorably. Therefore, the predetermined customer can sell the power at a higher price.

A power sale timing optimum control system according to a fourth invention is the power sale timing optimum control system according to the third invention, where the timing determination unit determines a time when a ratio of the amount of suppliable power predicted for the predetermined customer to the predicted total amount of suppliable power for the customer group is equal to or greater than a second predetermined value to be the power sale timing.

Thus, when the ratio of the amount of suppliable power of the predetermined customer that wishes to sell the power to the total amount of power that can be supplied by the customer group becomes equal to or greater than the second predetermined value, the ratio of the amount of stored power of the predetermined customer to the total amount of stored power increases. In this case, it is conceivable that a right to determine the price can be given to the predetermined customer. Therefore, the predetermined customer can sell power at a higher price.

A power sale timing optimum control system according to a fifth invention is the power sale timing optimum control system according to the first or second invention, wherein the customer group power supply amount prediction unit includes a generated power amount prediction unit, and a stored power amount prediction unit. The generated power amount prediction unit predicts a sum of amounts of generated power of the plurality of power generation devices owned by the customer group. The stored power amount prediction unit predicts a total amount of the stored power from the total amount of stored power in the customer group acquired by the stored power amount acquisition unit, the predicted total amount of demand, and the predicted total amount of generated power. The timing determination unit determines a time when a ratio of a total amount of power that can be supplied by the customer group predicted by the customer group power supply amount prediction unit to the amount of shortage obtained by subtracting the total amount of generated power and a predicted total amount of stored power from the total amount of demand is equal to or smaller than a third predetermined value to be the power sale timing.

Thus, when the ratio of the total amount of stored power to the amount of shortage obtained by subtracting the total amount of generated power and the total amount of stored power from the total amount of demand is small, this is a situation in which more power is required in the market, and therefore, it is possible to sell power advantageously at a higher price.

A power sale timing optimum control system according to a sixth invention is the power sale timing optimum control system according to the third or fifth invention, wherein the amount of suppliable power is the predicted amount of stored power in the storage battery.

Thus, the power sale timing can be determined on the basis of the total amount of stored power of the customer group and the amount of stored power of a predetermined customer that wishes to sell the power.

For example, when the amount of suppliable stored power of the predetermined customer that wishes to sell the power is large relative to the total amount of stored power of the customer group, it is conceivable that the price can be set favorably. Therefore, the predetermined customer can sell the power at a higher price.

Further, when the ratio of the total amount of stored power to the amount of shortage obtained by subtracting the total amount of generated power and the total amount of stored power from the total amount of demand is small, this is a situation in which more power is required in the market, and therefore, it is possible to sell power advantageously at a higher price.

A power sale timing optimum control system according to a seventh invention is the power sale timing optimum control system according to the fifth invention, wherein the timing determination unit determines a time when a ratio of the amount of suppliable power predicted for the predetermined customer to the total amount of suppliable power predicted in the customer group is equal to or greater than a second predetermined value to be the power sale timing.

Thus, when the ratio of the amount of stored power of the predetermined customer that wishes to sell the power to the total amount of stored power in the customer group becomes equal to or greater than the second predetermined value, the ratio of the amount of stored power of the predetermined customer to the total amount of stored power increases. In this case, it is conceivable that a right to determine the price can be given to the predetermined customer. Therefore, the predetermined customer can sell power at a higher price.

A power sale timing optimum control system according to an eighth invention is the power sale timing optimum control system according to the first invention, wherein the customer group power supply amount prediction unit includes a generated power amount prediction unit that predicts a sum of amounts of generated power of the plurality of power generation devices owned by the customer group. The timing determination unit determines a time when a ratio of the predicted total amount of generated power to the predicted total amount of demand is equal to or less than a fourth predetermined value to be the power sale timing.

Thus, when the ratio of the total amount of generated power to the total amount of demand is less than the predetermined value, the amount of demand cannot be fulfilled by the amount of generated power, and therefore, it is conceivable that the price of the power in market trading will be set high. Therefore, by selling electricity at this timing, the power can be sold at a higher price.

A power sale timing optimum control system according to a ninth invention is the power sale timing optimum control system according to the eighth invention, where the customer group power supply amount prediction unit further includes a stored power amount prediction unit that predicts the sum of amounts of the stored power from the total amount of stored power in the customer group acquired by the stored power amount acquisition unit, the predicted sum of amounts of demand, and the predicted total amount of generated power. The timing determination unit determines a time when a ratio of a total amount of power that can be supplied by the customer group predicted by the customer group power supply amount prediction unit to the amount of shortage obtained by subtracting the total amount of generated power and the predicted total amount of stored power from the total amount of demand is equal to or less than a third predetermined value to be the power sale timing.

Thus, when the ratio of total amount of stored power to the amount of shortage obtained by subtracting the total amount of generated power and the total amount of stored power from the total amount of demand is small, this is a situation in which more power is required in the market, and therefore, it is possible to sell power advantageously at a higher price.

A power sale timing optimum control system according to a tenth invention is the power sale timing optimum control system according to the ninth invention, wherein the sum of the amounts of suppliable power is a sum of predicted amounts of power stored in the storage battery.

A power sale timing optimum control system according to an eleventh invention is the power sale timing optimum control system according to the first invention, wherein the customer group power supply amount prediction unit includes a generated power amount prediction unit, a stored power amount prediction unit, and a calculation unit. The supply amount prediction unit predicts the total amount of generated power of the plurality of power generation devices in the customer group. The stored power amount prediction unit predicts a total amount of stored power from the total amount of stored power acquired by the stored power amount acquisition unit, the predicted amount of demand, and the predicted amount of generated power. The calculation unit calculates a total amount of supply on the basis of the predicted total amount of the stored power and the predicted total amount of generated power.

Accordingly, the amount of supply can be predicted in detail.

For example, when the total amount of suppliable power predicted at a predetermined time is calculated, the total amount of generated power predicted from a current point in time to a predetermined time is added to the total amount of stored power at the present point in time, and the predicted total amount of demand from the current point in time to the predetermined time is subtracted from the summed amount of power to predict the total amount of stored power at the predetermined time. By adding the amount of generated power at the predetermined time to the predicted total amount of stored power at the predetermined time, it is possible to predict the total amount of power that can be supplied at the predetermined time.

A power sale timing optimum control method according to a twelfth invention is a power sale timing optimum control method for determining a power sale timing of a predetermined customer that owns both a storage battery and a power generation device in a customer group including a plurality of customers, and includes a stored power amount acquisition step, a customer group demand amount prediction step, a customer group power supply amount prediction step, and a timing determination step. The stored power amount acquisition step includes acquiring the amount of stored power of each of a plurality of storage batteries owned by the customer group. The customer group demand amount prediction step includes predicting a total amount of power demand of the customer group. The customer group power supply amount prediction step includes predicting a total amount of power that can be supplied by the customer group on the basis of the acquired amount of stored power. The timing determination step includes determining a power sale timing of the predetermined customer on the basis of the predicted total amount of demand and the amount of suppliable power predicted in the customer group.

Accordingly, it is possible to predict the total amount of demand in the customer group and predict the total amount of suppliable power on the basis of the amounts of stored power of the respective customers. It is possible to determine the power sale timing on the basis of the predicted total amount of demand and the total amount of suppliable power.

For example, in market trading, if power sale to a power company or another customer is performed when the total amount of demand is greater than the total amount of suppliable power, it is conceivable that the price of power will be set high.

Therefore, it is possible to determine an advantageous power sale timing with a high price on the basis of the total amount of demand and the total amount of suppliable power.

The customer group may include a customer that does not own a storage battery or a power generation device.

Further, the prediction of the amount of demand may be performed on the basis of, for example, information such as weather forecast (temperature or humidity) or may be performed on the basis of information such as a change in past power consumption.

Further, the prediction of the amount of supply may be performed from, for example, the amount of generated power based on information such as weather forecast (temperature or humidity) or the like, or may be performed on the basis of history data of the amount of generated power.

A computer-readable recording medium including power sale timing optimum control program according to a thirteenth invention that determines a power sale timings of a predetermined customer that owns both a storage battery and a power generation device in a customer group including a plurality of customers, wherein the power sale timing optimum control program causes a computer to execute a power sale timing optimum control method comprising: a stored power amount acquisition step, a customer group demand amount prediction step, a customer group power supply amount prediction step, and a timing determination step. The stored power amount acquisition step includes acquiring the amount of stored power of each of a plurality of storage batteries owned by the customer group. The customer group demand amount prediction step includes predicting a total amount of demand on power of the customer group. The customer group power supply amount prediction step includes predicting a total amount of power that can be supplied by the customer group on the basis of the acquired amount of stored power. The timing determination step includes determining a power sale timing of the predetermined customer on the basis of the predicted total amount of demand and the amount of suppliable power predicted in the customer group.

Accordingly, it is possible to predict the total amount of demand in the customer group and predict the total amount of suppliable power on the basis of the amounts of stored power of the respective customers. It is possible to determine the power sale timing on the basis of the predicted total amount of demand and the total amount of suppliable power.

For example, in market trading, if power sale to a power company or another customer is performed when the total amount of demand is greater than the total amount of suppliable power, it is conceivable that the price of power will be set high.

Therefore, it is possible to determine an advantageous power sale timing with a high price on the basis of the total amount of demand and the total amount of suppliable power.

The customer group may include a customer that does not own a storage battery or a power generation device.

Further, the prediction of the amount of demand may be performed on the basis of, for example, information such as weather forecast (temperature or humidity) or may be performed on the basis of information such as a change in past power consumption.

Further, the prediction of the amount of supply may be performed from, for example, the amount of generated power based on information such as weather forecast (temperature or humidity) or the like, or may be performed on the basis of history data of the amount of generated power.

Advantageous Effects of Invention

According to the present invention, it is possible to provide a power sale timing optimum control system, a power sale timing optimum control method, and a power sale timing optimum control program capable of determining an advantageous power sale timing.

DESCRIPTION OF EMBODIMENTS

Figure 1:
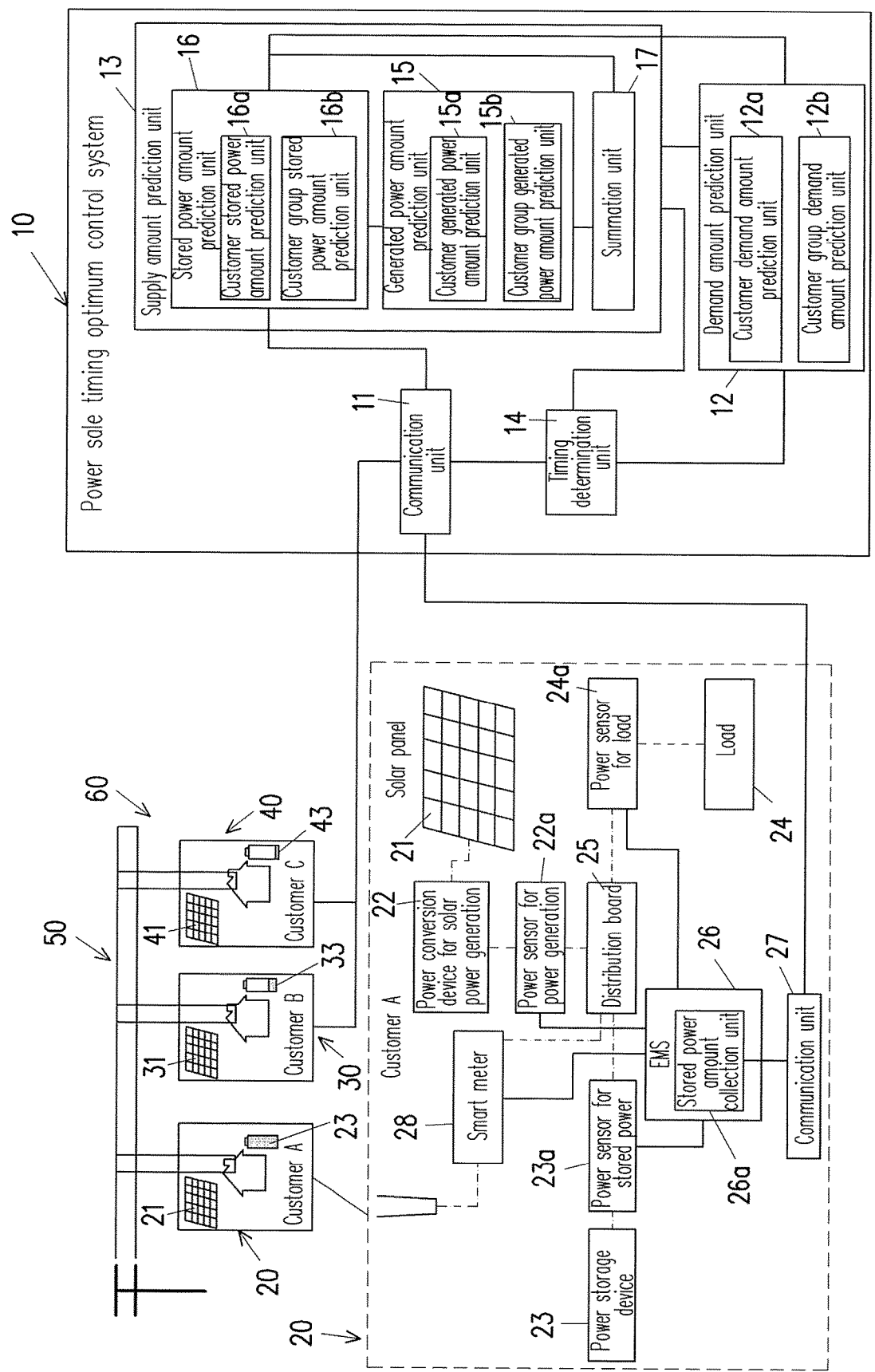
FIG. 1 is a block diagram illustrating a relationship between a power sale timing optimum control system and a plurality of customers according to Embodiment 1 of the present invention.

Hereinafter, a power sale timing optimum control system, a power sale timing optimum control method, and a power sale timing optimum control program according to an embodiment of the present invention will be described with reference to the drawings.

Here, a customer A20 that appears in the following description owns a power generation device (a solar panel 21) and a storage battery (a power storage device 23). When power is insufficient, the customer A 20 can buy power from the outside and when power is surplus, the customer A 20 can sell power to the outside.

Similar to the customer A20, another customer B30 also has a power generation device (a solar panel 31) and a storage battery (a power storage device 33), and a customer C40 also has a power generation device (a solar panel 41) and a storage battery (a power storage device 43), similar to the customer A 20.

The customer A 20, the customer B 30, and the customer C 40 are included in a customer group 60.

A customer is an individual, a corporation, an organization, or the like that makes a contract with a power company and uses power that is supplied from the power company via a system 50 (see FIG. 1). For example, a general household (a detached house or a condominiums), a company (an office, a factory, a facility, or the like), a local government, a national agency, or the like is included.

Further, the above-described outside includes a power company or another customer. That is, examples of the outside to which the customer A 20 sells the power may include the power company or the other customers B 30 and C 40.

In the following embodiment, a smart meter 28 (see FIG. 1) is a measurement instrument that is installed for each customer, measures the amount of generated power, the amount of stored power, and the amount of consumed power, and transmits a measurement result to the power company or the like using a communication function. By installing the smart meter 28, the power company can accurately recognize a real-time power situation of the customer A 20, and automate meter reading work that is performed at predetermined intervals. Although not shown, the smart meter is also installed for the customer B 30 and the customer C 40.

Further, in the following embodiment, a load 24 (FIG. 1) is a power consumption body such as an air conditioner, a refrigerator, a microwave, an IH cooking heater, or a television when the customer is a general household. Further, for example, when the customer is a company (a factory, or the like), the load 24 includes power consumption bodies such as various facilities or air conditioning equipment installed in the factory.

Further, in the following embodiment, an energy management system (EMS) 26 (FIG. 1) is a system that is installed for each customer and is provided to reduce the amount of consumed power of each customer. The EMS 26 is connected to the power sale timing optimum control system 10 over a network.

Embodiment 1

<Configuration>

The power sale timing optimum control system 10 according to Embodiment 1 is a system that determines an optimum timing to sell surplus power. In FIG. 1, the power sale timing optimum control system 10 determines an optimal power sale timing of the customer A 20.

Specifically, the power sale timing optimum control system 10 predicts a total amount of demand in the customer group 60, predicts a total amount of power that can be supplied in the customer group 60, and determines the power sale timing of the customer A 20 on the basis of the total amount of demand and the total amount of suppliable power.

A solid line connecting the components illustrated in FIG. 1 indicates a flow of information such as data, and a dash-dotted line indicates a flow of electricity.

Further, a configuration of the power sale timing optimum control system 10 of the embodiment will be described below in detail.

(Customer A)

As illustrated in FIG. 1, the power sale timing optimum control system 10 of the embodiment is connected to the EMS 26 of the customer A 20 that wishes to sell power.

As illustrated in FIG. 1, the customer A20 includes a solar panel (a power generation device) 21, a power conversion device (PCS) for solar power generation 22, a power sensor for generated power 22a, a storage device (a storage battery) 23, a power sensor for stored power 23a, the load 24, a power sensor for a load 24a, a distribution board 25, the energy management system (EMS) 26, a communication unit 27, and the smart meter 28.

The solar panel (power generation device) 21 is a device that generates electricity using a photovoltaic effect in which light energy of sunlight is used, and is installed on a roof of the customer A20 or the like. The amount of generated power in the solar panel 21 can be predicted on the basis of information on a sunshine duration of a weather forecast.

As illustrated in FIG. 1, the power conversion device for solar power generation (power conditioning system (PCS)) 22 is connected to the solar panel 21 and converts a direct current generated in the solar panel 21 into an alternating current.

As illustrated in FIG. 1, the power sensor for generated power 22a is connected to the power conversion device for solar power generation 22, and measures the amount of power generated by the solar panel 21. The power sensor for generated power 22a transmits a measurement result (generated power amount) to the EMS 26.

The power storage device (storage battery) 23 is provided to temporarily store surplus power that cannot be consumed by the load 24 among the power generated in the solar panel 21. Accordingly, even when the amount of consumed power in the load 24 is small in a time zone during the daytime in which the power is generated by the solar panel 21, surplus power is stored in the power storage device 23, thereby preventing waste of the generated power.

As illustrated in FIG. 1, the power sensor for stored power 23a is connected to the power storage device 23 and measures the amount of power stored in the power storage device 23. The power sensor for stored power 23a transmits a measurement result (stored power amount) to the EMS 26.

As described above, the load 24 is a power consumption body such as a home appliance such as an air conditioner or a refrigerator in a general household, or a facility or an air conditioning device in a factory or the like, and consumes the power that is supplied from the system 50, the power generated by the solar panel 21, and the power stored in the power storage device 23.

As illustrated in FIG. 1, the power sensor for a load 24a is connected to the load 24, and measures the amount of power that is consumed by the load 24. The power sensor for a load 24a transmits a measurement result (amount of consumed power) to the EMS 26.

As illustrated in FIG. 1, the distribution board 25 is connected to the power sensor for generated power 22a, the power sensor for stored power 23a, the power sensor for a load 24a, and the smart meter 28. The distribution board 25 supplies the power generated by the solar panel 21, the power stored in the power storage device 23, or the power bought from the system 50 to the load 24.

Further, the distribution board 25 supplies surplus power to the system 50 via the smart meter 28 on the basis of the power sale timing determined by the power sale timing optimum control system 10. Accordingly, the customer A 20 can sell the surplus power to the power company or the other customers B 30 and C 40.

The energy management system (EMS) 26 is an energy management system provided to reduce the amount of consumed power of the customer A 20, as described above, and the energy management system (EMS) 26 is connected to the power sensor for generated power 22a, the power sensor for stored power 23a, and the power sensor for a load 24a, as illustrated in FIG. 1. Further, the EMS 26 is connected to the communication unit 27. Further, the EMS 26 efficiently supplies the generated power of the solar panel 21 and the stored power in the power storage device 23 to the load 24 using detection results received from the sensors 22a, 23a, and 24a. Accordingly, it is possible to effectively reduce power cost of the customer A 20 by suppressing the amount of consumption of power that is supplied from the system 50.

Further, the EMS 26 includes a stored power amount collection unit 26a connected to the power sensor for stored power 23a, and the stored power amount collection unit 26a collects the amount of stored power of the power storage device 23. The collection of the amount of stored power is performed by a current or a voltage detected by the power sensor for stored power 23a.

The communication unit 27 transmits the amount of stored power collected by the stored power amount collection unit 26a to the power sale timing optimum control system 10. The communication unit 27 communicates with a communication unit 11 of the power sale timing optimum control system 10 wirelessly or by wire.

As described above, the smart meter 28 measures the amount of power generated by the solar panel 21 owned by the customer A 20, the amount of stored power in the power storage device 23, and the amount of consumed power in the load 24. As illustrated in FIG. 1, the smart meter 28 is connected to the sensors 22a, 23a, and 24a via the distribution board 25. Further, the smart meter 28 has a communication function, and transmits information on the amount of generated power, the amount of stored power, and the amount of consumed power of the customer A 20 to the power company.

Although only the solar panels 31 and 41 and the power storage devices 33 and 43 are shown for the configurations owned by the customer B 30 and the customer C 40 in FIG. 1, the customers B 30 and C 40 have a configuration that is the same as that of the customer A 20.

(Power Sale Timing Optimum Control System)

The power sale timing optimum control system 10 includes the communication unit 11, a demand amount prediction unit 12, a supply amount prediction unit 13, and a timing determination unit 14.

The communication unit 11 receives the information on the amount of stored power of the power storage devices 23, 33, and 43 owned by the customers A 20, B 30, and C 40. For example, in the case of the customer A 20, the communication unit 11 communicates with the communication unit 27 owned by the customer A 20 and acquires the information on the amount of charge of the power storage device 23. The customers B 30 and C 40 also include a communication unit, and the communication unit 11 also receives information on the amounts of stored power of the power storage devices 33 and 43.

The demand amount prediction unit 12 includes a customer demand amount prediction unit 12a and a customer group demand amount prediction unit 12b. The customer demand amount prediction unit 12a predicts the amount of demand required by each of the customers A 20, B 30 and C 40 included in the customer group 60. The prediction of the amount of demand can be performed on the basis of information such as a weather forecast. Further, the amount of demand may be predicted on the basis of history data of demanded amount such as a living pattern or a change in the amount of consumed power of each of the customers A 20, B 30, and C 40.

The customer demand amount prediction unit 12a predicts the amount of demand a(kw) at a predetermined time and an accumulated amount of demand as(kwh) from a current time to the predetermined time. In other words, the demand amount prediction unit 12 predicts the amount of demand a(kw) over time occasionally as well as the accumulated amount of demand as(kwh) from the current time to the time when the amount of demand a(kwh) is predicted.

The customer group demand amount prediction unit 12b sums the amounts of demand a of the customers A 20, B 30, and C 40 to calculate the predicted total amount of demand Ta(kw) for the customer group 60.

The supply amount prediction unit 13 predicts a total amount of power that can be supplied by each of customers A 20, B 30, and C 40 and the power that can be supplied in the customer group 60. The supply amount prediction unit 13 includes a generated power amount prediction unit 15, a stored power amount prediction unit 16, and a summation unit 17.

The generated power amount prediction unit 15 includes a customer generated power amount prediction unit 15a and a customer group generated power amount prediction unit 15b. The customer generated power amount prediction unit 15a predicts the amount of generated power in the respective solar panels 21, 31, and 41 of customers A 20, B 30, and C 40. The prediction of the amount of generated power may be performed from the amount of power generated by the solar panels 21, 31, and 41 based on information such as weather forecast (temperature or humidity), or may be performed on the basis of history data of generated power.

In the case of customer A 20, the generated power amount prediction unit 15 predicts the amount of generated power b(kw) of the solar panel 21 at the predetermined time and an accumulated amount of generated power bs(kwh) from the current time to the predetermined time. In other words, the generated power amount prediction unit 15 predicts the amount of generated power b(kw) from time to time predicted over time, and the accumulated amount of generated power bs(kwh) from the current time to the time when the amount of generated power b(kw) is predicted. The customer group generated power amount prediction unit 15b sums the amounts of generated power b of customers A 20, B 30, and C 40 to calculate the predicted total amount of generated power Tb(kw) from time to time for the customer group 60.

The stored power amount prediction unit 16 includes a customer stored power amount prediction unit 16a and a customer group stored power amount prediction unit 16b. The customer stored power amount prediction unit 16a predicts the amount of stored power d(kwh) of each of the power storage devices 23, 33, and 43 at a predetermined time on the basis of the amount of stored power c(kwh) of each of the power storage devices 23, 33, and 43 at a current time acquired by the communication unit 11, the accumulated amount of demand as(kwh) of each of customers A 20, B 30, and C 40 predicted by the customer demand amount prediction unit 12a of the demand amount prediction unit 12, and the accumulated amount of generated power bs(kwh) of each of the solar panels 21, 31, and 41 predicted by the generated power amount prediction unit 15.

Specifically, in the case of customer A 20, when the amount of stored power at the current time of the power storage device 23 is c(kwh), the amount of the stored power d(kwh) at a predetermined time is calculated using an expression of c+bs−as.

It is possible to perform the prediction of the amount of stored power in a certain period from the current time by calculating the amount of stored power d at each time (the above-described predetermined time) at regular intervals in the certain period from the current time.

The customer group stored power amount prediction unit 16b calculates the total amount of stored power Td(kw) from time to time predicted in the customer group 60 by summing the amounts of the stored power d of customers A 20, B 30, and C 40.

The summation unit 17 sums the amounts of generated power d(kwh) predicted at a predetermined time and the amount of generated power b(kw) predicted at the predetermined time to calculate the amount of suppliable power f (=d+b) at the predetermined time. Further, the summation unit 17b calculates the total amount of power Tf(kw) that can be supplied from time to time which is predicted in the customer group 60, by summing the amounts of suppliable power f of customers A 20, B 30, and C 40.

Also, the summation unit 17 may sum the total amount of stored power Td calculated by the customer group stored power amount prediction unit 16b and the total amount of generated power Tb calculated by the customer group generated power amount prediction unit 15b to calculate a total amount of suppliable power Tf (Td+Tb).

Further, in the supply amount prediction unit 13, the customer stored power amount prediction unit 16a that predicts the amount of stored power of each customer, the customer generated power amount prediction unit 15a that predicts the amount of generated power of each customer, and the summation unit 17 that sums the predicted amount of stored power of each customer and the predicted amount of generated power of each customer correspond to an example of a customer power supply amount prediction unit that predicts the amount of suppliable power for each customer.

Further, in the supply amount prediction unit 13, the customer group stored power amount prediction unit 16b that predicts the amount of stored power of the customer group, the customer group generated power amount prediction unit 15b that predicts the amount of generated power of the customer group, and the summation unit 17 correspond to an example of a customer group power supply amount prediction unit that predicts the amount of suppliable power for the customer group.

The timing determination unit 14 performs the determination of the power sale timing on the basis of, for example, the predicted amount of suppliable power f(kw), the predicted amount of demand a(kw) at the predetermined time, and the predicted amount of generated power b(kw) at the predetermined time.

<Operation>

Next, an operation of the power sale timing optimum control system 10 according to the embodiment of the present invention will be described, and the power sale timing optimum control method will also be described.

Figure 2:
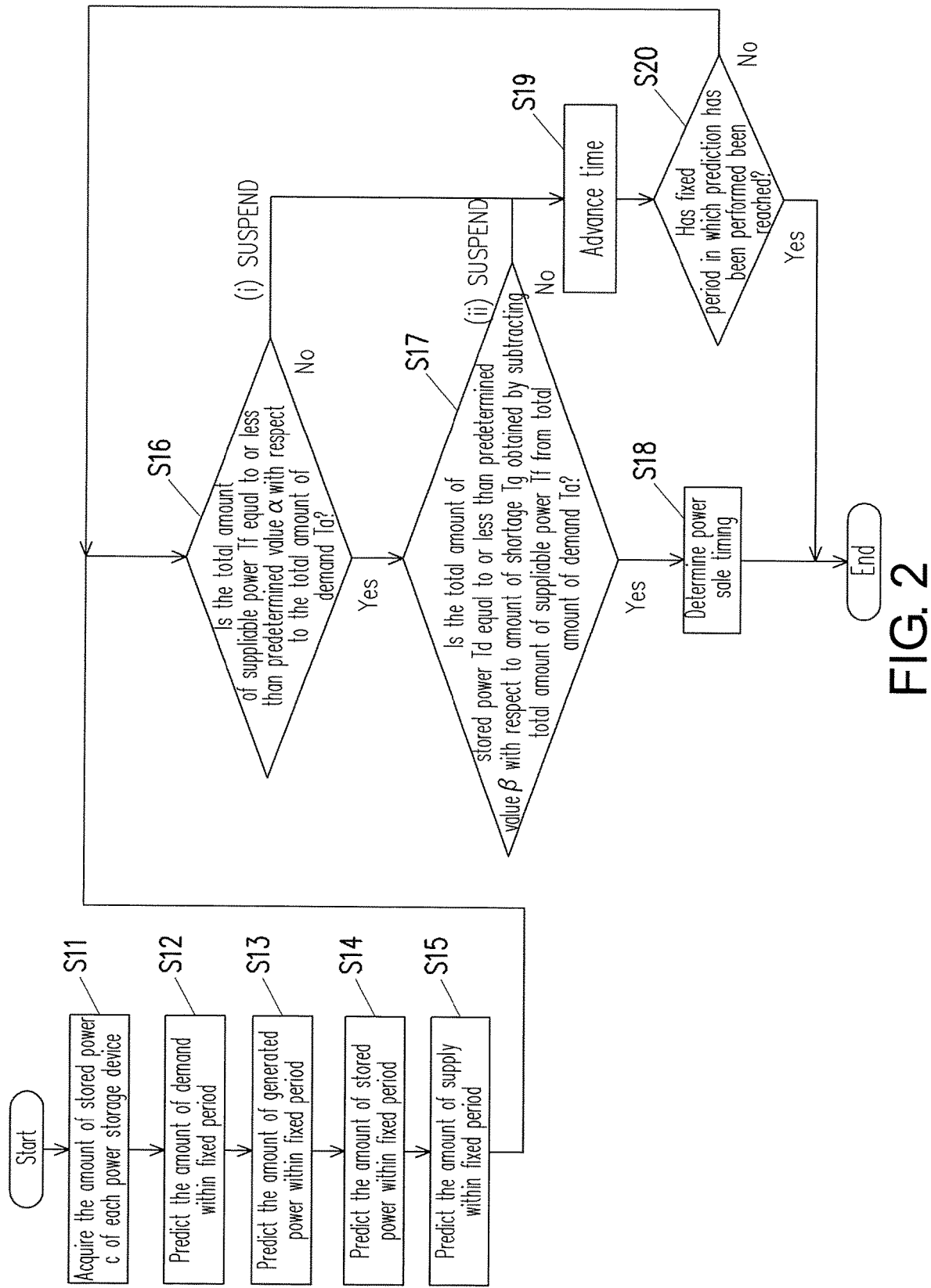
FIG. 2 is a flowchart illustrating an operation of the power sale timing optimum control system of FIG. 1.

FIG. 2 is a flowchart illustrating an operation of the power sale timing optimum control system 10 according to the embodiment.

As illustrated in FIG. 2, in step S11, the power sale timing optimum control system 10 acquires the amounts of stored power at the current time of the power storage devices 23, 44, and 43 owned by the respective customers A 20, B 30, and C 40 in the customer group 60 via the communication unit 11. Step S11 corresponds to an example of a stored power amount acquisition step.

Next, in step S12, the demand amount prediction unit 12 predicts the amount of demand within a fixed period of each of customers A 20, B 30, and C 40 in the customer group 60. Step S12 corresponds to an example of a demand amount prediction step. Here, the fixed period can be set to, for example, half a day, sunshine time, one day, or a meter reading period. The demand amount prediction unit 12 predicts the amount of demand a(kw) from time to time within the fixed period, and predicts an integrated amount of demand as until the demand amount a is predicted. Further, the demand amount prediction unit 12 calculates the total amount of demand Ta(kw) from time to time predicted in the customer group 60 by summing the amounts of demand a of customers A 20, B 30, and C 40.

Then, in steps S13 to S15, the supply amount prediction unit 13 predicts the supply amount within the fixed period for each of the customers A 20, B 30, and C 40 in the customer group 60. Steps S13 to S15 correspond to an example of a supply amount prediction step. The supply amount prediction unit 13 predicts the amount of power f(kw) that can be supplied from time to time within the fixed period of each of customers A 20, B 30, and C 40.

Specifically, in step S13, the generated power amount prediction unit 15 predicts the amount of generated power b(kw) from time to time, and an accumulated amount of generated power bs(kwh) from a current time to a time at which the amount of generated power b(kw) is predicted, for each of the customers A 20, B 30, and C 40.

Then, in step S14, the stored power amount prediction unit 16 predicts the amount of stored power d (=c+bs−as) of each of the power storage devices 23, 33, and 43 at the predetermined time on the basis of the amount of stored power c of each of the power storage devices 23, 33, and 43 at the current time, the accumulated amount of demand as of each customer predicted by the demand amount prediction unit 12, and the accumulated amount of generated power bs of each of the solar panels 21, 31, and 41 predicted by the generated power amount prediction unit 15, for each of customers A 20, B 30, and C 40.

In step S15, the summation unit 17 sums the predicted amount of stored power d(kwh) at a predetermined time and the predicted amount of generated power b(kw) at the predetermined time to calculate the amount of power f (=d+b) that can be supplied at the predetermined time for each of the customers A 20, B 30, and C 40. The summation unit 17 calculates the total amount of power Tf(kw) that can be supplied from time to time, which is predicted in the customer group 60, by summing the amounts of power that can be supplied by customers A 20, B 30, and C 40.

Then, in step S16, the timing determination unit 14 determines whether a ratio of the total amount of suppliable power Tf to the total amount of demand Ta in the customer group 60 is equal to or smaller than a predetermined value α. The predetermined value α can be set to, for example, 0.80 (80%).

Figure 3:
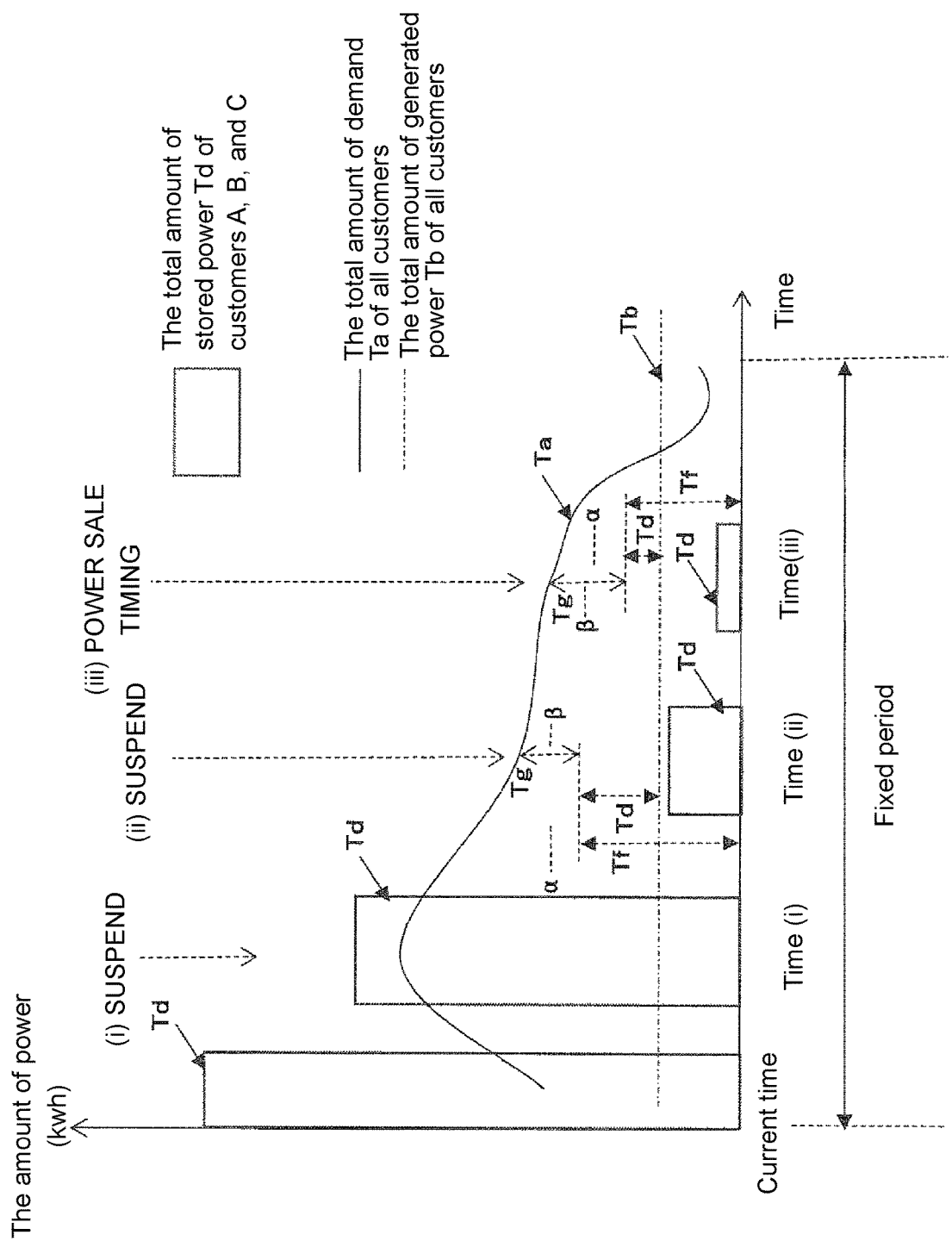
FIG. 3 is a graph illustrating prediction of a total amount of demand power, a total amount of generated power, and a total amount of stored power in a customer group.

FIG. 3 is a graph illustrating prediction data over time of the total amount of stored power Td, the total amount of demand Ta, and the total amount of generated power Tb. In FIG. 3, the total amount of demand Ta of customers A 20, B 30, and C 40 is represented by a solid line. Further, in FIG. 3, the total amount of generated power Tb of customers A 20, B 30, and C 40 is represented by a dash-dotted line. Further, in FIG. 3, the total amount of stored power Td at a current time and the total amount of stored power Td at times (i), (ii), and (iii) predicted by the stored power amount prediction unit 16 are represented by a bar graph.

For example, the total amount of suppliable power Tf at time (i) is the total amount of stored power Td at time (i)+the total amount of generated power Tb, but this value is greater than total amount of demand Ta at time (i). Therefore, in step S16, the timing determination unit 14 does not determine that time (i) is the power sale timing and suspends the determination.

In this case, the timing determination unit 14 advances the time in step S19. In step S20, it is determined whether or not the fixed period in which the prediction has been performed in steps S12 to S15 has been reached. That is, the timing determination unit 14 gradually advances the time until the fixed period in which the prediction has been performed is reached, and determines whether or not to determine that the time is the power sale timing.

Then, at time (ii) illustrated in FIG. 3, the total amount of suppliable power Tf (the total amount of stored power Td at time (ii)+the total amount of generated power T Tb) is equal to or less than a predetermined value α (0.8) of the total amount of demand Ta at time (ii), and therefore, the control proceeds to step S17. In step S17, it is determined whether or not a ratio of the total amount of stored power Td at time (ii) to the amount of shortage Tg obtained by subtracting the total amount of generated power Tb from the total amount of demand Ta at time (ii) is equal to or less than a predetermined value β. Here, the predetermined value β can be set to, for example, 0.5 (50%).

At time (ii), since the ratio of the total amount of stored power Td to the amount of shortage Tg obtained by subtracting the total amount of generated power Tb from the total amount of demand Ta is greater than the predetermined value β (for example, 0.5), the timing determination unit 14 does not determine that time (ii) is the power sale timing.

On the other hand, at time (iii), the total amount of suppliable power Tf (the total amount of stored power Td at time (iii)+the total amount of generated power Tb) is equal to or less than the predetermined value α(0.8) of the total amount of demand Ta at time (iii), and a ratio of the total amount of stored power Td at time (iii) to the amount of shortage Tg is less than the predetermined value β (0.5). Therefore, the timing determination unit 14 determines that time (iii) is the power sale timing in step S18. Steps S16 to S20 correspond to an example of a timing determination step.

The determined power sale timing is transmitted from the communication unit 11 to the communication unit 27 of customer A, and power sale is performed at customer A at this power sale timing. The power sale target may be a power company or may be other customers B 30 and C 40.

As described above, since the power sale timing optimum control system 10 can determine the power sale timing on the basis of the total amount of demand Ta and total amount of suppliable power Tf, it is possible for customer A 20 to sell power in advantageous conditions (for example, a high price).

Further, the power sale timing optimum control system 10 determines the power sale timing when the ratio of the total amount of suppliable power Tf to the total amount of demand Ta is equal to or less than the predetermined value α. Accordingly, the power sale can be performed when the ratio of the total amount of suppliable power Tf to the total amount of demand Ta is low. In market trading, trading conditions such as prices are determined through competition between trading participants, and therefore, a power sale price can be set to be higher when the supply is short, and power sale can be performed in advantageous conditions such as a higher price.

Further, the power sale timing optimum control system 10 determines the power sale timing when the ratio of the total amount of stored power Td to the amount of shortage Tg is equal to or less than the predetermined value β. Accordingly, the power sale can be performed when the ratio of the total amount of stored power Td to the amount of shortage Tg is low. In this case, since the amount of stored power of other customers is small, it is possible to sell power at a higher price.

Embodiment 2

Hereinafter, a power sale timing optimum control system 10 according to Embodiment 2 of the present invention will be described.

<1. Configuration>

The power sale timing optimum control system 10 of Embodiment 2 has the same basic configuration as that of Embodiment 1, but is different from that of Embodiment 1 in that the summation unit 17 is not provided, and in a control operation. Therefore, this difference will be mainly described.

Figure 4:
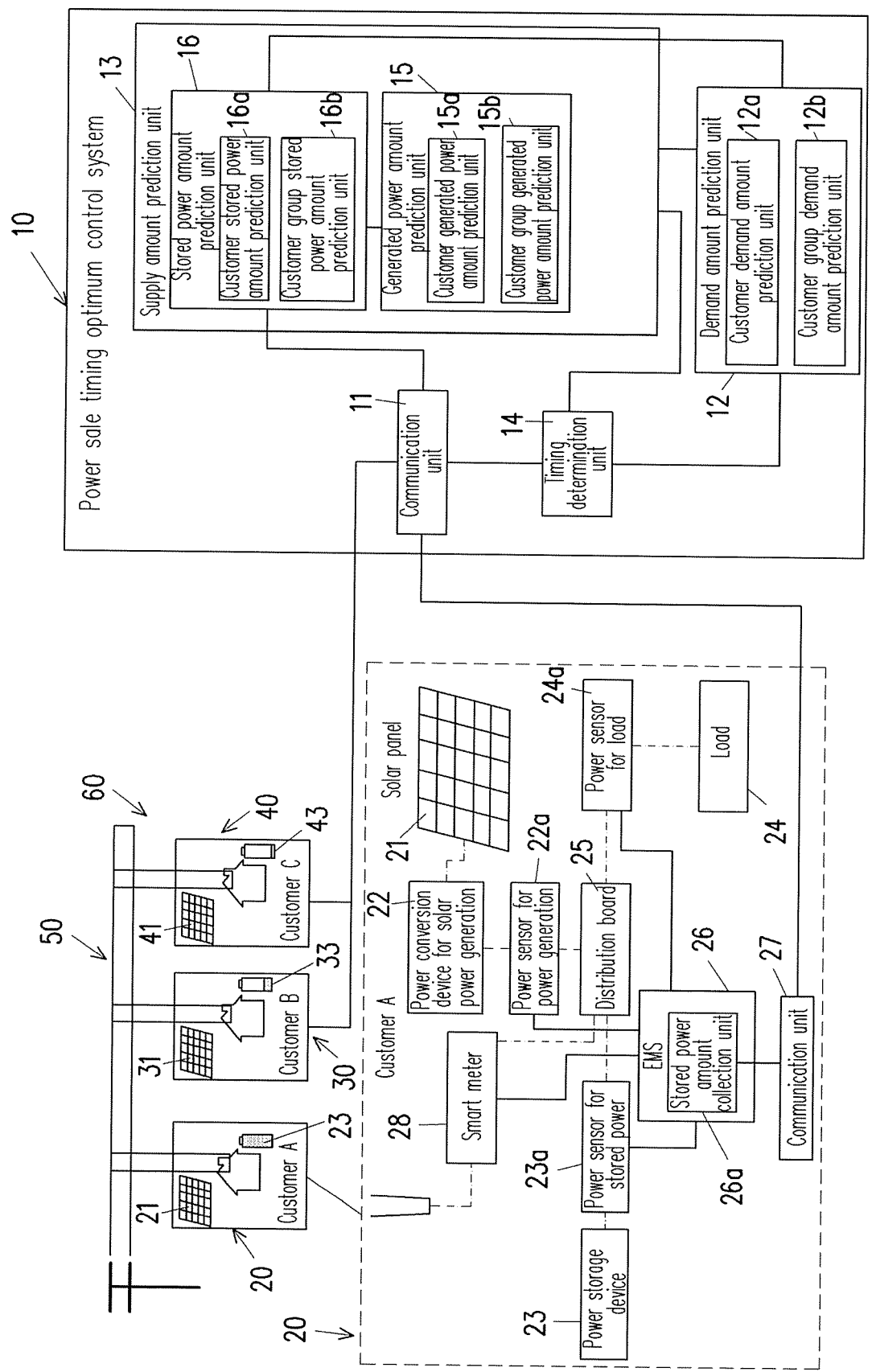
FIG. 4 is a block diagram illustrating a relationship between a power sale timing optimum control system and a plurality of customers in Embodiment 2 of the present invention.

FIG. 4 is a control block diagram illustrating a configuration of the power sale timing optimum control system 100 of Embodiment 2. As illustrated in FIG. 4, in the power sale timing optimum control system 100 of Embodiment 2, the summation unit 17 is not provided, unlike the power sale timing optimum control system 10 of Embodiment 1. That is, calculation on the amount of power f (=d+b) that can be supplied at the predetermined time and the total amount of power Tf(kw) that can be supplied from time to time, which is predicted for the customer group 60, are not performed.

Summation of the amount of stored power d(kwh) predicted at the predetermined time and the amount of generated power b(kw) predicted at the predetermined time is not performed herein, and yet the amount of the stored power d and the amount of generated power b predicted at the predetermined time are set as an example of suppliable power as described below.

<2. Operation>

Figure 5:
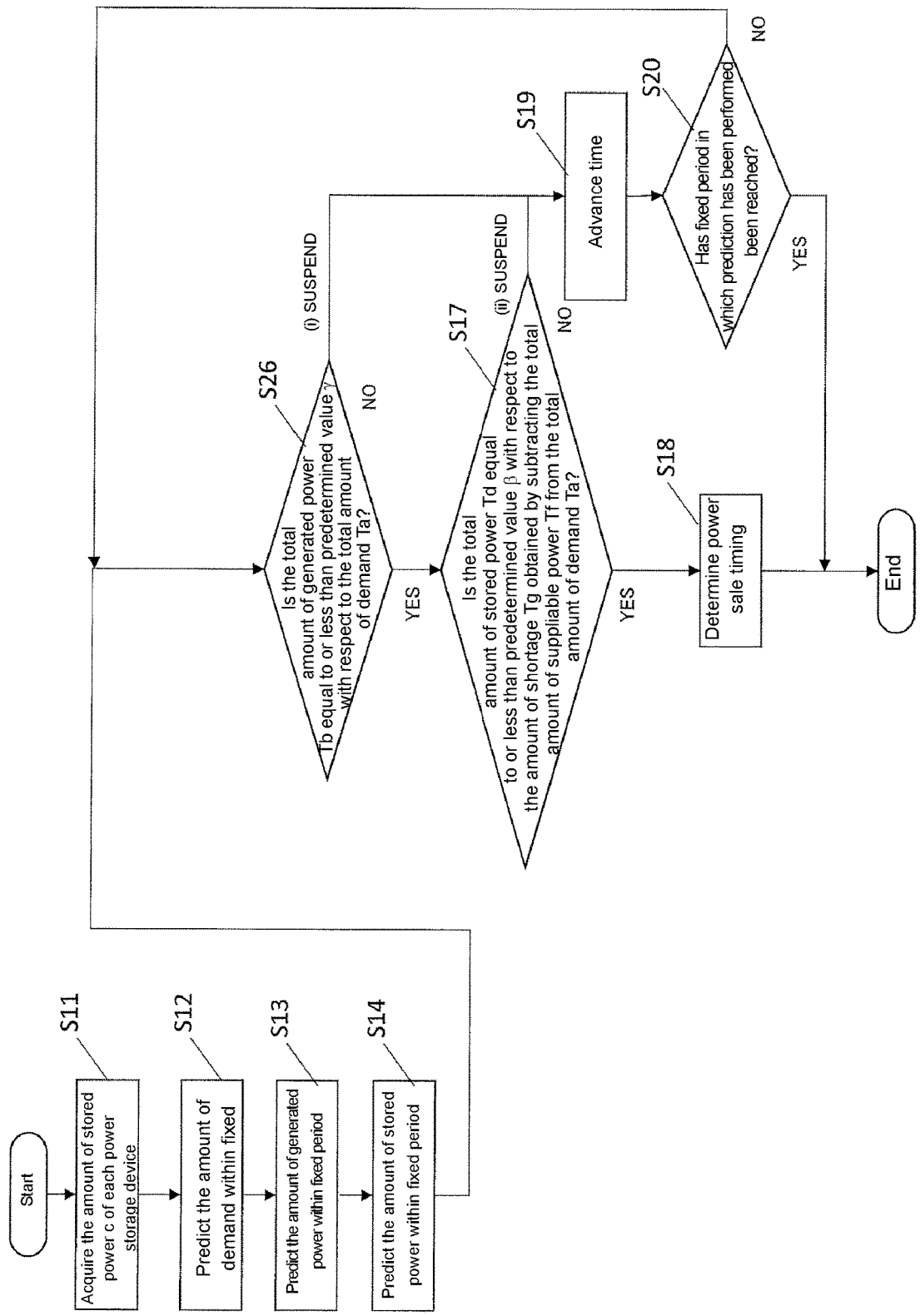
FIG. 5 is a flowchart illustrating an operation of the power sale timing optimum control system of FIG. 4.

FIG. 5 is a flowchart illustrating an operation of the power sale timing optimum control system 100 of Embodiment 2.

As illustrated in FIG. 5, the control flow from step S11 to step S14 is the same as in Embodiment 1. Step S11 corresponds to an example of a stored power amount acquisition step, and step S12 corresponds to an example of a demand amount prediction step. Steps S13 and S14 correspond to an example of a supply amount prediction step.

After step S14, in step S26, the timing determination unit 14 determines whether the ratio of the total amount of generated power Tb to the total amount of demand Ta is equal to or less than the predetermined value γ. Here, the predetermined value γ can be set to, for example, 0.5 (50%).

Figure 6:
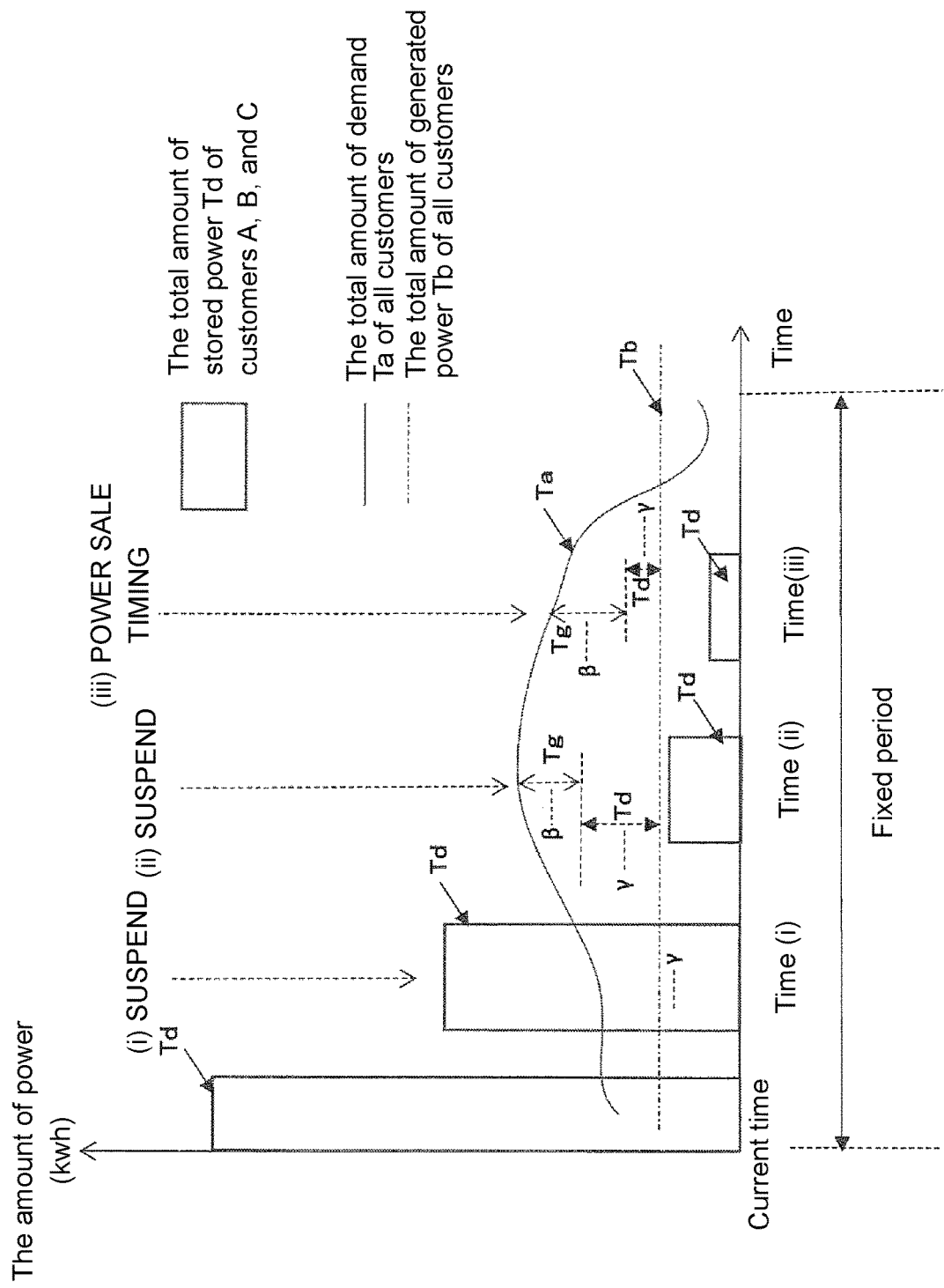
FIG. 6 is a graph illustrating prediction of a total amount of demand, a total amount of generated power, and a total amount of stored power in a customer group.

FIG. 6 is a graph illustrating prediction data over time of the total amount of stored power Td, the total amount of demand Ta, and the total amount of generated power Tb. In FIG. 6, the total amount of demand Ta of customers A 20, B 30, and C 40 is represented by a solid line. Further, in FIG. 6, the total amount of generated power Tb of customers A 20, B 30, and C 40 is represented by a dash-dotted line. In FIG. 6, the total amount of stored power Td at a current time and the total amount of stored power Td at time (i), time (ii), and time (iii) predicted by the stored power amount prediction unit 16 is represented by a bar graph.

For example, as illustrated in FIG. 6, a ratio of the total amount of generated power Tb to the total amount of demand Ta at time (i) is greater than the predetermined value γ (0.5). Therefore, the timing determination unit 14 does not determine time (i) to be the power sale timing in step S26, but suspends the determination of the power sale timing.

At time (ii) illustrated in FIG. 6, since the ratio of the total amount of generated power Tb to the total amount of demand Ta is equal to or less than the predetermined value γ (0.5), the control proceeds to step S17. In step S17, it is determined whether or not a ratio of the total amount of stored power Td at time (ii) to the amount of shortage Tg obtained by subtracting the total amount of generated power Tb from the total amount of demand Ta at time (ii) is equal to or less than a predetermined value β. Here, the predetermined value β can be set to, for example, 0.5 (50%).

At time (ii), since the ratio of the total amount of stored power Td to the amount of shortage Tg obtained by subtracting the total amount of generated power Tb from the total amount of demand Ta is greater than the predetermined value β (for example, 0.5), the timing determination unit 14 does not determine that time (ii) is the power sale timing.

On the other hand, at time (iii), a ratio of the total amount of generated power Tb to the total amount of demand Ta is equal to or smaller than the predetermined value γ (0.5), and a ratio of the total amount of stored power Td at time (iii) to the amount of shortage Tg is less than the predetermined value β (0.5). Therefore, the timing determination unit 14 determines that time (iii) is the power sale timing in step S18. Steps S26, and S17 to S20 correspond to an example of a timing determination step.

As described above, since the power sale timing optimum control system 10 can determine the power sale timing on the basis of the total amount of demand Ta, and the total amount of generated power Tb or the total amount of stored power Td as an example of as the amount of suppliable power, it is possible for the customer to sell power in advantageous conditions (for example, high price).

Further, the power sale timing optimum control system 10 determines a time when the ratio of the total amount of generated power Tb to the total amount of demand Ta is equal to or less than the predetermined value γ to be the power sale timing. Accordingly, the power sale can be performed when the ratio of the total amount of generated power Tb to the total amount of demand Ta is low. In market trading, trading conditions such as prices are determined through competition between trading participants, and therefore, power sale price can be set to be higher when the amount of generated power is insufficient, and power sale can be performed in advantageous conditions such as a higher price.

Further, the power sale timing optimum control system 10 determines the power sale timing when the ratio of the total amount of stored power Td to the amount of shortage Tg is equal to or less than the predetermined value β. Accordingly, the power sale can be performed when the ratio of the total amount of stored power Td to the amount of shortage Tg is low. In this case, since the amount of stored power of other customers is small, it is possible to sell power at a higher price.

Embodiment 3

Next, a power sale timing optimum control system of Embodiment 3 of the present invention will be described.

The power sale timing optimum control system 10 of Embodiment 3 has the same configuration as that of Embodiment 1, but is different from that of Embodiment 1 in a control operation. Therefore, this difference will be mainly described.

<Operation>

Figure 7:
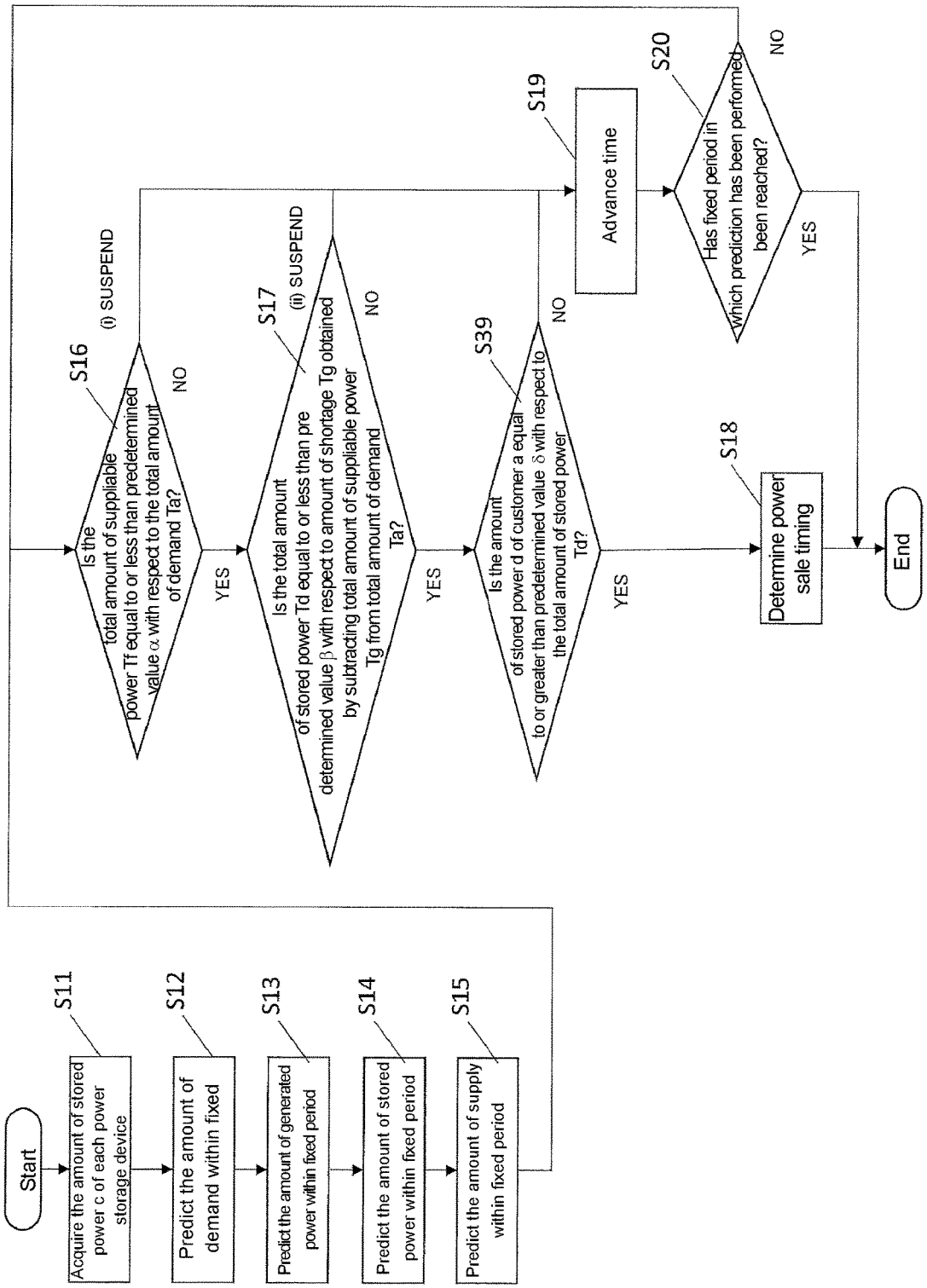
FIG. 7 is a flowchart illustrating an operation of a power sale timing optimum control system in Embodiment 3 of the present invention.
Figure 8:
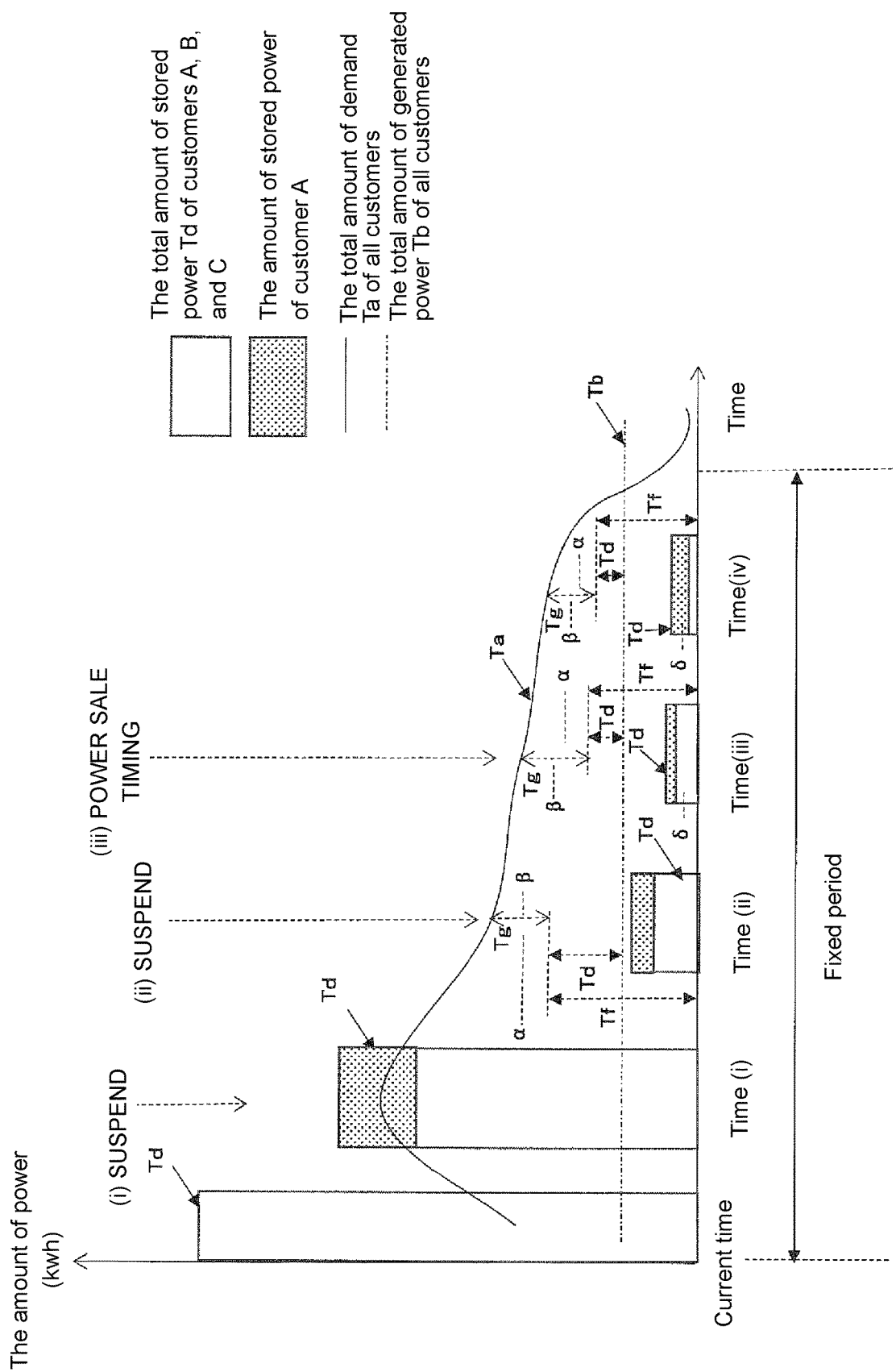
FIG. 8 is a graph illustrating prediction of a total amount of demand, a total amount of generated power, a total amount of stored power, and a total amount of stored power for customer A in the customer group.

FIG. 7 is a flowchart illustrating an operation of the power sale timing optimum control system 10 according to the embodiment. FIG. 8 is a graph illustrating prediction data over time of the total amount of stored power Td, the total amount of demand Ta, and the total amount of generated power Tb. In FIG. 8, the total amount of demand Ta of customers A 20, B 30, and C 40 is represented by a solid line. Further, in FIG. 8, the total amount of generated power Tb of customers A 20, B 30, and C 40 is represented by a dash-dotted line. In FIG. 8, the total amount of stored power Td at a current time, and the total amount of stored power Td and the amount of stored power d of customer A 20 at time (i), time (ii), time (iii) and time (iv) predicted by the stored power amount prediction unit 16 are represented by a bar graph. The graph up to time (iii) in FIG. 8 is the same as in FIG. 3.

As illustrated in FIG. 7, steps S11 to S17 are the same as those in Embodiment 1. In step S17, when the timing determination unit 14 determines that the ratio of the total amount of stored power Td at time (ii) to the amount of shortage Tg obtained by subtracting the total amount of generated power Tb from the total amount of demand Ta at time (ii) is equal to or less than a predetermined value β, the process proceeds to step S39.

In step S39, the timing determination unit 14 determines whether the ratio of the amount of stored power d of customer A to the total amount of stored power Td is equal to or greater than a predetermined value δ. Here, the predetermined value δ can be set to, for example, 0.5 (50%).

As illustrated in FIG. 8, at time (iii), the ratio of the total amount of suppliable power Tf (the total amount of stored power Td at time (iii)+the total amount of generated power Tb) to the total amount of demand Ta at time (iii) is equal to or less than the predetermined value α (0.8), and the ratio of the total amount of stored power Td at time (iii) to the amount of shortage Tg is equal to or less than the predetermined value β (0.5). However, at time (iii), since the ratio of the amount of the stored power d of customer A 20 to the total amount of stored power Td is less than the predetermined value δ (0.5), the timing determination unit 14 does not determine time (iii) to be the power sale timing and suspends the determination.

Then, at time (iv), the ratio of the total amount of suppliable power Tf (the total amount of stored power Td at time (iv)+the total amount of generated power Tb) is equal to or less than 0.8 (predetermined value α), and the ratio of the total amount of stored power Td at time (iv) to the amount of shortage Tg is equal to or less than the predetermined value β (0.5). At time (iv), since the ratio of the amount of stored power d of customer A to the total amount of stored power Td is equal to or greater than the predetermined value δ (0.5), the timing determination unit 14 determines time (iv) to be the power sale timing in step S18. Steps S16 to S20 and S39 correspond to an example of a timing determination step.

As described above, the power sale timing optimum control system 10 according to Embodiment 3 sets a time when the ratio of the amount of stored power d of customer A to the total amount of stored power Td is great as the power sale timing. When a customer having a high ratio of the amount of stored power has a right to set the price of power, customer A can sell power at an advantageous timing.

Other Embodiment

Although the embodiments of the present invention have been described above, the present invention is not limited to the above embodiments, and various modifications can be performed without departing from the gist of the invention.

(A)

In Embodiments 1 to 3, the example in which the power sale timing optimum control method is implemented according to the flowcharts illustrated in FIGS. 2, 5, and 7 as an example of the power sale timing optimum control method according to the present invention has been described, but the present invention is not limited thereto.

For example, the present invention may be implemented as a power sale timing optimum control program that causes a computer to execute the power sale timing optimum control method implemented according to the flowcharts illustrated in FIGS. 2, 5, and 7.

Further, one use aspect of the power sale timing optimum control program may be an aspect in which the power sale timing optimum control program is recorded in a computer-readable recording medium such as a ROM and operates in cooperation with the computer.

Further, one use aspect of the power sale timing optimum control program may be an aspect in which the power sale timing optimum control program is transmitted through a transmission medium such as the Internet or a transmission medium such as light, radio waves, or sound waves, read by a computer, and operated in cooperation with the computer.

Further, the above-described computer is not limited to hardware such as a central processing unit (CPU), but may include firmware, an operating system (OS), or a peripheral device.

As described above, the power sale timing optimum control method may be realized by software or hardware.

Further, the power sale timing optimum control system 10 may be a virtual server in a cloud computing system, or the power sale timing optimum control program may be executed by the virtual server.

(B)

Although only the customers that own both the storage battery and the power generation device are included in the customer group 60, as shown as customers A 20, B 30, and C 40 in the above embodiment, customers that own only one of the storage battery and the power generation device may be included or customers that do not own both of the storage battery and the power generation device may be included.

(C)

Although step S39 is added to the flowchart illustrated in FIG. 2 described in Embodiment 1 in Embodiment 3, step S39 may be added to the flowchart illustrated in FIG. 5 described in Embodiment 2.

(D)

Although the time when both of step S16 and step S17 are satisfied is determined to be the power sale timing in Embodiments 1 and 3 described above, a time when only any one of step S16 and step S17 is satisfied may be determined to be the power sale timing.

Further, although the time when both of step S26 and step S17 is satisfied is determined to be the power sale timing in Embodiment 2, a time when only any one of step S26 or step S17 is satisfied may be determined to be power sale timing.

(E)

Further, in Embodiment 3, the time when all of steps S16, S17, and S39 are satisfied is determined to be the power sale timing, but the present invention is not limited to the time when all of steps S16, S17, and S39 are satisfied. A time when only one of steps S16, S17, and S39 is satisfied may be determined to be the power sale timing or the two steps may be appropriately combined and a time when the steps are satisfied may be determined to be the power sale timing.

(F)

In Embodiments 1 to 3, the power sale timing optimum control system 10 or 100 acquires the amount of stored power of each customer via the communication unit (for example, the communication unit 27) owned by the customer, but the present invention is not limited thereto. For example, the communication unit 11 of the power sale timing optimum control system 10 or 100 may acquire the amount of stored power from the smart meter owned by each customer.

(G)

The predetermined value α, the predetermined value β, the predetermined value γ, the predetermined value δ, and the predetermined value η set in Embodiments 1 to 3 above and the (G) are not limited to the above-described values, and are set to a value less than 1 (100%).

(H)

In Embodiments 1 to 3 above, when the total amount of stored power Td is equal to or greater than the second predetermined value β with respect to the amount of shortage Tg in step S17, the flow proceeds to the determination of the power sale timing, but the present invention is not limited thereto. For example, control may proceed to the flow of determination of the power sale timing when total amount of suppliable power Tf is equal to or greater than a predetermined value with respect to the amount of shortage Tg.

(I)

In Embodiment 3, in step S39, the time when the ratio of the amount of stored power d of customer A to the total amount of stored power Td of the customer group 60 is equal to or greater than the predetermined value δ is determined to be the power sale timing, but the present invention is not limited thereto. For example, in step S39, a time when the ratio of the power amount f of suppliable power of customer A to the total amount of suppliable power Tf of the customer group 60 is equal to or greater than the predetermined value may be determined to be the power sale timing.

(J)

In Embodiments 1 to 3, the customer group demand amount prediction unit 12b predicts the total amount of demand in the customer group 60 by summing the values predicted by the customer demand amount prediction unit 12a, but the present invention is not limited thereto. For example, the demand of the entire customer group 60 may be predicted without summing the values predicted for the respective customer.

Further, the customer group generated power amount prediction unit 15b predicts the total amount of generated power in the customer group 60 by summing the values predicted by the customer generated power amount prediction unit 15a, but the present invention is not limited thereto. For example, the amount of generated power of the entire customer group 60 may be predicted without summing the values predicted for the respective customer.

Further, the customer group stored power amount prediction unit 16b may perform the prediction using the demand amount and amount of generated power predicted for the entire customer group 60 without summing the amounts of stored power for the respective customers predicted by the customer stored power amount prediction unit 16a.

(K)

In Embodiments 1 to 3, the example in which the solar panels 21, 31, and 41 (solar power generation devices) have been used as the power generation devices owned by the customers A 20, B 30, and C 40 has been described, but the present invention is not limited thereto.

For example, another power generation device such as a wind power generation device or a geothermal power generation device may be used as the power generation device owned by a plurality of customers.

INDUSTRIAL APPLICABILITY

The power sale timing optimum control system, the power sale timing optimum control method, and the power sale timing optimum control program of the present invention have an effect that it is possible to determine an advantageous power sale timing, and are useful for, for example, customers owning a storage battery and a power generation device.

The invention claimed is:

1. A power sale timing optimum control system that determines a power sale timing of a predetermined customer that owns both a storage battery and a power generation device in a customer group including a plurality of customers, the power sale timing optimum control system comprising:
a communication I/O interface;
a processor, configured to:
acquire the amount of stored power of each of a plurality of storage batteries owned by the customer group through the communication I/O interface, wherein for each of the customers in the customer group, the amount of the stored power of the storage battery is measured by a smart meter installed the corresponding customer and transmitted to the communication I/O interface;
predict a total amount of demand on power of the customer group;
predict a total amount of suppliable power that can be supplied by the customer group on the basis of the acquired amount of stored power;
determine the power sale timing of the predetermined customer on the basis of the amount of stored power of the storage battery corresponding to the predetermined customer, the predicted total amount of demand, the predicted total amount of suppliable power for the customer group, and a predicted amount of suppliable power for the predetermined customer, wherein the power sale timing of the predetermined customer comprises a time when a ratio of the predicted amount of suppliable power for the predetermined customer to the predicted total amount of suppliable power for the customer group is equal to or greater than a first threshold value, wherein the predicted amount of suppliable power for the predetermined customer is predicted on the basis of the acquired amount of stored power in the storage battery; and
transmit the power sale timing of the predetermined customer through the communication I/O interface, wherein a power sale is performed at the predetermined customer at the power sale timing to other customers in the customer group or a power company.

2. The power sale timing optimum control system according to claim 1, wherein the power sale timing further comprises a time when a ratio of the total amount of suppliable power that can be supplied by the customer group to the total amount of demand is equal to or smaller than a second threshold value to be the power sale timing.

3. The power sale timing optimum control system according to claim 1, wherein the processor is further configured to:
predict a total amount of generated power of the plurality of power generation devices owned by the customer group; and
predict a total amount of stored power according to a total of the amount of stored power of the customer group, the predicted total amount of demand, and the predicted total amount of generated power, and
wherein the power sale timing of the predetermined customer further comprises a time when a ratio of a total amount of suppliable power that can be supplied by the customer group to the amount of shortage obtained by subtracting the total amount of generated power and a predicted total amount of stored power from the total amount of demand is equal to or less than a third threshold value.

4. The power sale timing optimum control system according to claim 1, wherein the processor is furthered configured to:
predict a total amount of generated power of the plurality of power generation devices owned by the customer group, and
wherein the power sale timing of the predetermined customer further comprises a time when a ratio of the predicted total amount of generated power to the predicted total amount of demand is equal to or less than a fourth threshold value.

5. A power sale timing optimum control method for determining a power sale timing of a predetermined customer that owns both a storage battery and a power generation device in a customer group including a plurality of customers, the power sale timing optimum control method including:
measuring the amount of stored power of each of a plurality of storage batteries owned by the customer group by using a smart meter installed in the corresponding customer;
predicting a total amount of demand on power of the customer group;
predicting a total amount of power that can be supplied by the customer group on the basis of the measured amount of stored power;
determining the power sale timing of the predetermined customer on the basis of the amount of stored power of the storage battery corresponding to the predetermined customer, the predicted total amount of demand, the predicted total amount of suppliable power for the customer group, and a predicted amount of suppliable power for the predetermined customer, wherein the power sale timing of the predetermined customer comprises a time when a ratio of the predicted amount of suppliable power for the predetermined customer to the predicted total amount of suppliable power for the customer group is equal to or greater than a first threshold value, wherein the predicted amount of suppliable power for the predetermined customer is predicted on the basis of the acquired amount of stored power in the storage battery; and
transmitting the power sale timing of the predetermined customer, wherein a power sale is performed at the predetermined customer at the power sale timing to other customers in the customer group or a power company.

6. A non-transitory computer-readable recording medium comprising a power sale timing optimum control program that determines a power sale timing of a predetermined customer that owns both a storage battery and a power generation device in a customer group including a plurality of customers, the power sale timing optimum control program causing a computer to execute a power sale timing optimum control method comprising:
measuring the amount of stored power of each of a plurality of storage batteries owned by the customer group by using a smart meter installed in the corresponding customer;
predicting a total amount of demand on power of the customer group;
predicting a total amount of suppliable power that can be supplied by the customer group on the basis of the measured amount of stored power;
determining the power sale timing of the predetermined customer on the basis of the amount of stored power of the storage battery corresponding to the predetermined customer, the predicted total amount of demand, the predicted total amount of suppliable power for the customer group, and a predicted amount of suppliable power for the predetermined customer, wherein the power sale timing of the predetermined customer comprises a time when a ratio of the predicted amount of suppliable power for the predetermined customer to the predicted total amount of suppliable power for the customer group is equal to or greater than a first threshold value, wherein the predicted amount of suppliable power for the predetermined customer is predicted on the basis of the acquired amount of stored power in the storage battery; and
transmitting the power sale timing of the predetermined customer, wherein a power sale is performed at the predetermined customer at the power sale timing to other customers in the customer group or a power company.

* * * * *